US006334128B1

(12) United States Patent
Norcott et al.

(10) Patent No.: US 6,334,128 B1
(45) Date of Patent: Dec. 25, 2001

(54) METHOD AND APPARATUS FOR EFFICIENTLY REFRESHING SETS OF SUMMARY TABLES AND MATERIALIZED VIEWS IN A DATABASE MANAGEMENT SYSTEM

(75) Inventors: William D. Norcott, Nashua, NH (US); Mohamed Ziauddin, Fremont, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/224,063

(22) Filed: Dec. 28, 1998

(51) Int. Cl.[7] ............................. G06F 7/00; G06F 17/30
(52) U.S. Cl. ................................ 707/5; 707/10; 707/8; 707/102; 345/326; 345/335; 709/201
(58) Field of Search ........................... 707/5, 3, 4, 200, 707/102, 103, 201, 203, 204; 709/101

(56) References Cited

U.S. PATENT DOCUMENTS

| | | | |
|---|---|---|---|
| 4,631,673 | * 12/1986 | Haas et al. | 364/600 |
| 5,546,579 | * 8/1996 | Josten et al. | 395/600 |
| 5,787,415 | * 7/1998 | Jacobson et al. | 707/2 |
| 5,897,632 | 4/1999 | Dar et al. | 707/2 |
| 6,125,360 | 9/2000 | Witkowski et al. | 707/2 |
| 6,134,543 | * 10/2000 | Witkowski et al. | 707/2 |
| 6,199,063 | 3/2001 | Colby et al. | 707/4 |

OTHER PUBLICATIONS

Chaudhuri et al. "Optimizing queries with materialized views", Mar. 1995, IEEE Cat. No. 95CH35724, p. 190–200.*

Byung Suk et al. "Outer joins and filters for instantiating objects from retional databases through views", Feb. 1994, IEEE vol. 6 issues 1, p. 108–119.*

Chaudhuri, Surajit et al., "Optimizing Queries with Materialized Views", Proceedings of the Eleventh International Conference on Data Engineering, Mar 6–10, 1995, pp. 190–200.

Gopalkrishnan, Vivekanand et al., "Issues of Object–Relational View Design in Data Warehousing Environment", 1998 IEEE International Conference on Systems, Man and Cybernetics, Oct. 11–14, 1998, vol. 3, pp. 2732–2737.

Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.

Segev, Arie et al., "Maintaining Materialized Views in Distributed Databases", Proceedings of the Fifth International Conference on Data Engineering, Feb. 6–10, 1989, pp. 262–270.

* cited by examiner

Primary Examiner—Thomas Black
Assistant Examiner—Jacques Veillard
(74) Attorney, Agent, or Firm—Hickman Palermo Truong & Becker LLP; Brian D. Hickman

(57) ABSTRACT

A method and apparatus for refreshing stale materialized views is provided. Prior to executing a query to refresh a materialized view from data in the base tables of the materialized view, the query is rewritten to refresh the materialized view from data in one or more other materialized views. To take advantage of the efficiency gained by refreshing a materialized view based on another materialized view, a refresh sequence is established based on the dependencies between materialized views in the database system. The dependencies indicate which materialized views can be refreshed from which other materialized views. When a materialized view can be refreshed based on any one of a number of eligible materialized views, the refresh sequence may additionally take into account the relative benefit associated with refreshing the materialized view with each of the eligible materialized views.

22 Claims, 3 Drawing Sheets

METHOD AND APPARATUS FOR EFFICIENTLY REFRESHING SETS OF SUMMARY TABLES AND MATERIALIZED VIEWS IN A DATABASE MANAGEMENT SYSTEM

FIELD OF THE INVENTION

The present invention relates to a method and apparatus for efficiently refreshing sets of summary tables and materialized views in a database management system.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

In a database used for "data warehousing" or "decision support", it is common for identical or closely related queries to be issued frequently. For example, a business may periodically generate reports that summarize the business facts stored in the database, such as: "What have been the best selling brands of soft drinks in each of our sales regions, during the past six months?".

To respond to such queries, the database server typically has perform numerous joins because the database records that contain the information that is required to respond to the queries are often organized into a star schema. A star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables".

When a database management system contains very large amounts of data, certain queries against the database can take an unacceptably long time to execute. The cost of executing a query may be particularly significant when the query (which takes the form of a "SELECT" statement in the SQL database language) requires joins among a large number of database tables.

MATERIALIZED VIEWS

Among commercial users of database systems, it has become a common practice to store the results of often-repeated queries in database tables or some other persistent database object. By storing the results of queries, the costly join operations required to generate the results do not have to be performed every time the queries are issued. Rather, the database server responds to the queries by simply retrieving the pre-computed data.

These stored results are commonly referred to as materialized views. The contents of a materialized view is defined by metadata referred to as a view definition. The view definition contains mappings to one or more columns in the one or more tables containing the data. Typically, the view definition is in the form of a database query.

Columns and tables that are mapped to a materialized view are referred to herein as base columns and base tables of the materialized view, respectively. The data maintained in the base columns is referred to herein as base data. The data contained in a materialized view is referred to herein as materialized data.

Materialized views eliminate the overhead associated with gathering and deriving the data every time a query is executed. Computer database systems that are used for data warehousing frequently maintain materialized views that contain pre-computed summary information in order to speed up query processing. Such summary information is created by applying an aggregate function, such as SUM, COUNT, or AVERAGE, to values contained in the base tables. Materialized views that contain pre-computed summary information are referred to herein as "summary tables" or more simply, "summaries".

Summary tables typically store aggregated information, such as "sum of PRODUCT_SALES, by region, by month". Other examples of aggregated information include counts of tally totals, minimum values, maximum values, and average calculations.

QUERY REWRITE

Through a process known as query rewrite, a query can be optimized to recognize and use existing materialized views that could answer the query. Typically, the query rewrite optimization is transparent to the application submitting the query. That is, the rewrite operation happens automatically and does not require the application to know about the existence of materialized views, nor that a particular materialized view has been substituted for the original query.

Various query rewrite operations are described in the following U.S. Patent Applications:

U.S. patent application Ser. No. 09/221,641 entitled REWRITING A QUERY IN TERMS OF A SUMMARY BASED ON FUNCTIONAL DEPENDENCIES AND JOIN BACKS filed by Randall Bello, James Finnerty, and Mohamed Ziauddin on Dec. 28, 1998.

U.S. patent application Ser. No. 09/221,363 entitled REWRITING A QUERY IN TERMS OF A SUMMARY BASED ON ONE-TO-ONE LOSSLESSNESS OF JOINS filed by Randall Bello, James Finnerty, and Mohamed Ziauddin on Dec. 28, 1998.

U.S. patent application Ser. No. 09/222,249, entitled REWRITING A QUERY IN TERMS OF A SUMMARY BASED ON AGGREGATE COMPUTABILITY AND CANONICAL FORMAT filed by Jack Raitto, Mohamed Ziauddin, and James Finnerty on Dec. 28,1998 and now U.S. Pat. No. 5,991,754.

The contents of these applications are incorporated herein by this reference.

REFRESHING MATERIALIZED VIEWS

As new data is periodically added to the base tables of a materialized view, the materialized view needs to be updated to reflect the new base data. When a materialized view accurately reflects all of the data currently in its base tables, the materialized view is considered to be "fresh". Otherwise, the materialized view is considered to be "stale". A stale materialized view may be recomputed by various techniques that are collectively referred to as "refresh".

Data loading and refresh of materialized views typically takes place during off-hours when the data warehouse is in a controlled period of little activity. The data loading and refresh is restricted to a time period called the refresh window during which the system can be dedicated to refresh. The refresh window is typically allowed to be no more than four to six hours. Refresh may be deferred until the end of the week or month, so that loading of additional detail data may occur much more frequently than refresh.

One approach to refreshing materialized views is referred to as the "total refresh" or "full refresh" approach. According to the total refresh approach, the values in materialized views are recalculated based on all of the base data every time new base data is supplied. Systems that employ full refresh approach have the disadvantage that the recreation process is a relatively lengthy operation due to the size and number of tables from which the materialized data is derived. For example, when ten new rows are added to a particular base table that contains a million rows, a total refresh operation would have to process all one million and ten rows of the base table to regenerate the materialized views derived using the base table.

The process of updating materialized data may be improved by performing incremental refresh, where rather than generating a new set of materialized data based on calculations that use all of the base data, the materialized data is updated based on just the new base data.

Prior mechanisms for incremental refresh have relied upon the re-computing of materialized data as data is being loaded into base tables. Thus, as one set of rows is added to a base table, the materialized view is updated based on the data in the new rows. As a second set of rows is added to a base table, the materialized view is again updated based on the data in the second set of rows. This is not a practical nor efficient solution for two reasons: first, the database user may have business reasons to not re-compute the materialized view each and every time data is loaded into base tables; and second, combining refresh with data loading degrades the performance of the data-loading procedure.

To avoid the need to refresh a materialized view every time data is loaded into base tables, deferred refresh may be performed. Deferred refresh allows materialized views to become stale. For example, refresh may be deferred until the end of the week or month, so that loading of additional data into the base tables of a materialized view may occur much more frequently than refresh of the materialized view.

Refreshing materialized views often requires a significant amount of time and computational power. If not performed efficiently, it is possible for the overhead associated with refreshing materialized views to outweigh any benefits derived from using the materialized views for processing queries. Therefore, it is clearly desirable to provide a mechanism for increasing the efficiency of refresh operations, particularly in database systems that include many materialized views for which total refresh operations must be performed.

SUMMARY OF THE INVENTION

A method and apparatus for refreshing stale materialized views is provided. Prior to executing a query to refresh a materialized view from data in the base tables of the materialized view, the query is rewritten to refresh the materialized view from data in one or more other materialized views. By performing the refresh based on data from other materialized views, rather than from the base tables themselves, the overhead associated with the refresh operation may be significantly reduced.

To take advantage of the efficiency gained by refreshing a materialized view based on another materialized view, a refresh sequence is established based on the dependencies between materialized views in the database system. The dependencies indicate which materialized views can be refreshed from which other materialized views.

Such dependencies may be determined by a query rewrite mechanism that dynamically builds a dependency graph. When a materialized view can be refreshed based on any one of a number of eligible materialized views, the query rewrite mechanism uses the dependency graph to identify the set of materialized views that are eligible for refreshing the materialized view, and additionally determines the corresponding query reduction factors for refresh queries of the materialized view. Based on the query reduction factors thus determined, the relative benefit associated with refreshing the materialized view with each of the eligible materialized views is determined. The refresh sequence takes into account the relative benefit associated with refreshing the materialized view with each of the eligible materialized views.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for efficiently refreshing summary tables and materialized views is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
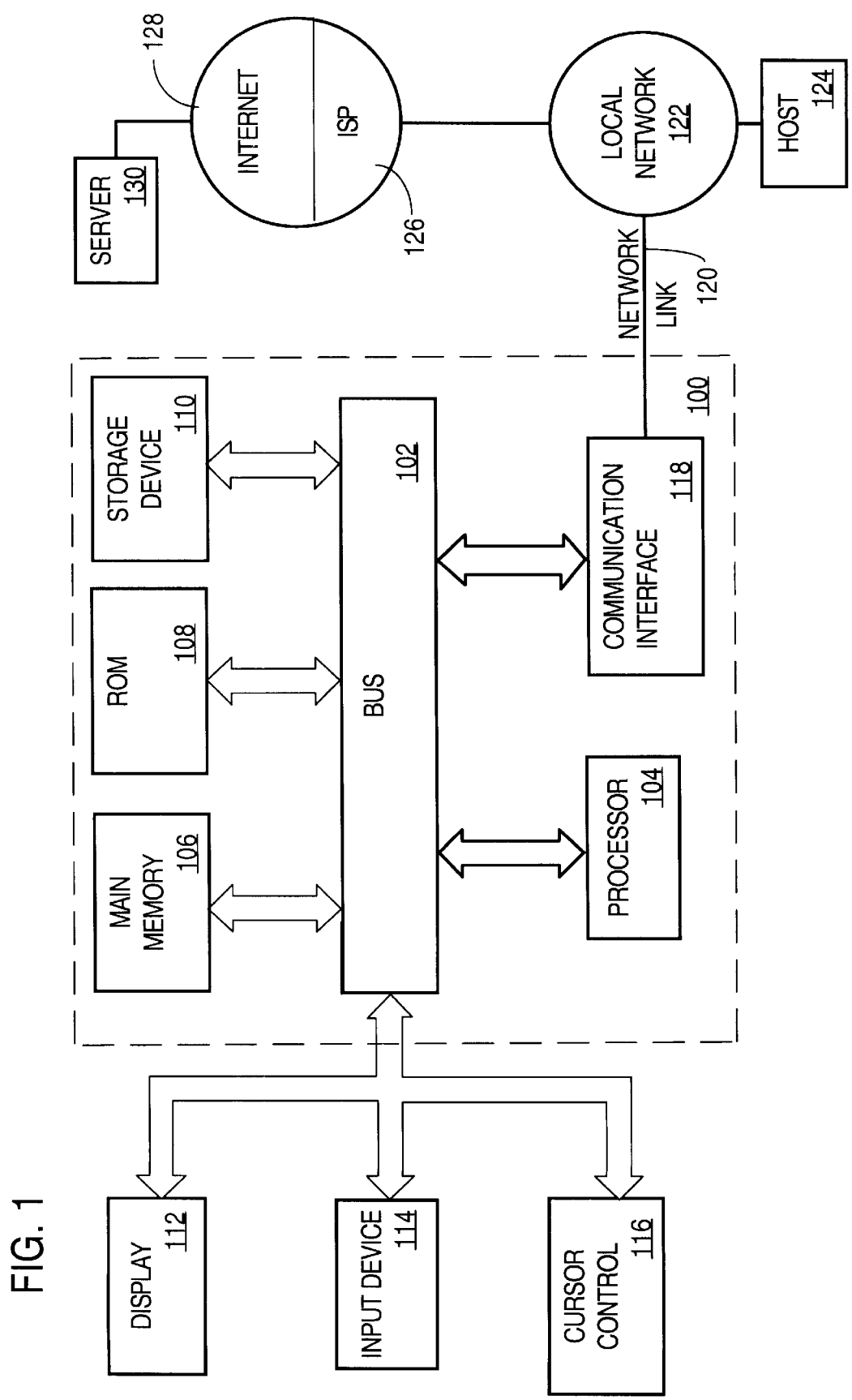
FIG. 1 is a block diagram of a computer system on which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for efficiently refreshing a set of summary tables and materialized views. According to one embodiment of the invention, a refresh mechanism is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Functional Overview

When a database system has many materialized views, it is possible that the most efficient way to refresh a particular materialized view is to refresh it based on data from another materialized view, rather than based on data from the base tables of the materialized view. However, before data from the another materialized view may be used to perform the refresh, that other materialized view must itself be fresh. Consequently, the order in which materialized views are refreshed may have a significant impact on the efficiency of the refresh operations.

According to one aspect of the invention, a refresh mechanism is provided that establishes a sequence for refreshing materialized views. The refresh sequence established by the refresh mechanism takes into account the increased efficiency that may be obtained by refreshing materialized views based on other existing, fresh materialized views. By refreshing the materialized views in the established sequence, the amount of time required to refresh all of the stale materialized views in a database may be significantly reduced.

Refreshing a Materialized View With Date From Another Materialized View

As mention above, various techniques have been developed for refreshing a materialized view, either through incremental or total refresh operations. Both types of refresh operations are typically performed by executing database statements that access the base tables of the materialized view that is being refreshed. The database statements that are executed to refresh a materialized view are referred to herein as "refresh queries".

For total refresh operations, the refresh query of a materialized view is simply the query that defines the materialized view. For incremental refresh operations, the refresh query may be any of a series of queries used to update the materialized view based on changes made to the base tables of the materialized view. Examples of refresh queries that may be used for performing incremental refresh of materialized views are given in the following U.S. Patent Applications:

U.S. patent application Ser. No. 09/083,643 entitled METHOD AND APPARATUS FOR INCREMENTAL REFRESH OF SUMMARY TABLES IN A DATABASE SYSTEM, filed by William D. Norcott and James Finnerty on May 22, 1998.

U.S. patent application Ser. No. 08/839,190 entitled METHOD AND APPARATUS FOR IDENTIFYING NEW DATA BY ADDRESS RANGES, filed by William D. Norcott on Apr. 21, 1997.

The contents of these applications are incorporated herein by reference.

According to one aspect of the invention, refresh queries that can be performed more efficiently by accessing materialized views are rewritten to access the materialized views, rather than the tables referenced in the original refresh queries. By refreshing materialized views from other materialized views in this manner, significant efficiencies may be achieved, as shown in the following example.

A data warehouse keeps daily sales information for the years 1988 through 1997 for each of 10 cities. The largest detail table in the warehouse is named FACT, and it has 2.8 billion rows. The database has two materialized views A and B that are defined by the following queries:

A: SELECT L.CITY, T.YEAR, SUM(F.SALES) SUMSAL

FROM LOCATION L, TIME T, FACT F

WHERE F.LOCID=L.LOCID

AND F.TIMEID=T.TIMEID

GROUP BY CITY, YEAR

In natural language terms, the query for materialized view A asks the question: "what are the yearly sales totals for each city?" In the present example, the summary table produced by this query contains 100 records.

B: SELECT L.CITY, T.WEEK, T.YEAR, SUM (F.SALES) SUMSAL

FROM LOCATION L, TIME T, FACT F

WHERE F.LOCID=L.LOCID

AND F.TIMEID=T.TIMEID

GROUP BY CITY, YEAR, WEEK

In natural language terms, the query for materialized view B asks the question: "what are the weekly sales totals for each city?" In the present example, the summary table produced by this query contains 5200 records.

It may take approximately two hours to perform a total refresh of each summary from the base data, resulting in four hours of refresh operations. In this example, the contents of A may be derived from the contents of B. Specifically, the yearly sales for each city may be computed by grouping by year the weekly sales of each city, and then summing the sales that belong to each group. For example, summing the sales figures of a particular city for weeks 1.52 of year 1997 will result in the yearly sales figure of that city for the year 1997.

Thus, if B is refreshed first, then the contents of B may be used to refresh A. During a refresh of A based on B, a SUM and GROUP BY is performed on only 5200 records, versus the 2.8 billion records and three-way join needed to refresh A from its base tables. Consequently, it may only take less than one second to refresh A based on B, where it previously took two hours to refresh A based on the base tables of A.

Only fresh materialized views can be used to refresh other materialized views. For example, B could not be used to refresh A if B itself were not fresh. Therefore, the sequence in which materialized views are refreshed can have a significant impact on the efficiency of refresh. In the present example, if A is refreshed before B, B is not available to refresh A. In addition, A does not have data that can be used to refresh B. Consequently, the total time to refresh A and B is four hours. However, if B is refreshed before A, B may be used to refresh A, and the total time to refresh A and B is two hours and one second.

Therefore, according to an embodiment of the invention, a refresh mechanism is provided that establishes a refresh sequence that takes into account which materialized views can be used to rewrite the refresh queries of other materialized views. Those techniques are described in greater detail hereafter.

Refresh Sequencing Based On Dependencies

According to one aspect of the invention, the refresh mechanism refreshes materialized views in a sequence that takes into account the dependencies between the various materialized views in the database. In this context, a first materialized view "depends" on a second materialized view if the refresh query for the first materialized view can be rewritten to access the second materialized view.

To establish the refresh sequence, the refresh mechanism first determines the dependencies that exist among the various materialized views in the database. Using this dependency information, the refresh mechanism builds a refresh dependency graph. The refresh dependency graph is then used to determine a sequence for refreshing the materialized views. The materialized views are then refreshed according to the refresh sequence.

The various steps involved in determining dependencies, building a dependency graph, and establishing a refresh sequence based on the dependency graph shall be described in greater detail hereafter.

Determining Dependencies

According to one embodiment of the invention, the process of determining dependencies between materialized views that belong to a particular set of materialized views involves determining, for each materialized view in the set, whether the refresh query for the materialized view can be rewritten to access any of the other materialized views in the set. For example, consider a set of materialized views that includes materialized views A, B and C. The process of determining dependencies between the materialized views in that set involves determining whether (1) the refresh query for A can be rewritten to access B, (2) the refresh query for A can be rewritten to access C, (3) the refresh query for B can be rewritten to access A, (4) the refresh query for B can be rewritten to access C, (5) the refresh query for C can be rewritten to access A, and (6) the refresh query for C can be rewritten to access B.

The process of determining whether any particular materialized view can be used to rewrite a query typically involves performing a series of tests. The tests include tests for (1) join compatibility and (2) data sufficiency. For summary tables, the tests additionally include tests for (3) grouping compatibility and (4) aggregate computability. These tests, and examples of how these tests may be implemented, are described in detail in U.S. patent application Ser. No. 09/224063, entitled REWRITING A QUERY IN TERMS OF A SUMMARY BASED ON FUNCTIONAL DEPENDENCIES AND JOIN BACKS filed on same day herewith by Randall Bello, James Finnerty, and Mohamed Ziauddin, the contents of which is incorporated herein by reference.

According to one embodiment of the invention, an ALL_REWRITE function is provided which may be invoked by the refresh mechanism to determine the set of materialized views on which a particular materialized view depends. The ALL_REWRITE function takes an arbitrary SELECT statement (the "input query") and produces a list of the materialized views that could be used to satisfy the input query. If the input query cannot be rewritten to use any existing materialized view, then the ALL_REWRITE function returns NULL. According to one embodiment, the ALL_REWRITE function returns an identifier for each materialized view that can be used to rewrite the input query (each "eligible" materialized view). Optionally, the ALL_REWRITE function may also be configured to return a "benefit" value that indicates the relative benefit of rewriting the input query to access each eligible materialized view.

According to one embodiment of the invention, the process of dynamically generating a dependency graph, identifying eligible materialized views, and determining the query reduction factor for the eligible materialized views, is performed by a query rewrite mechanism.

Figure 2:
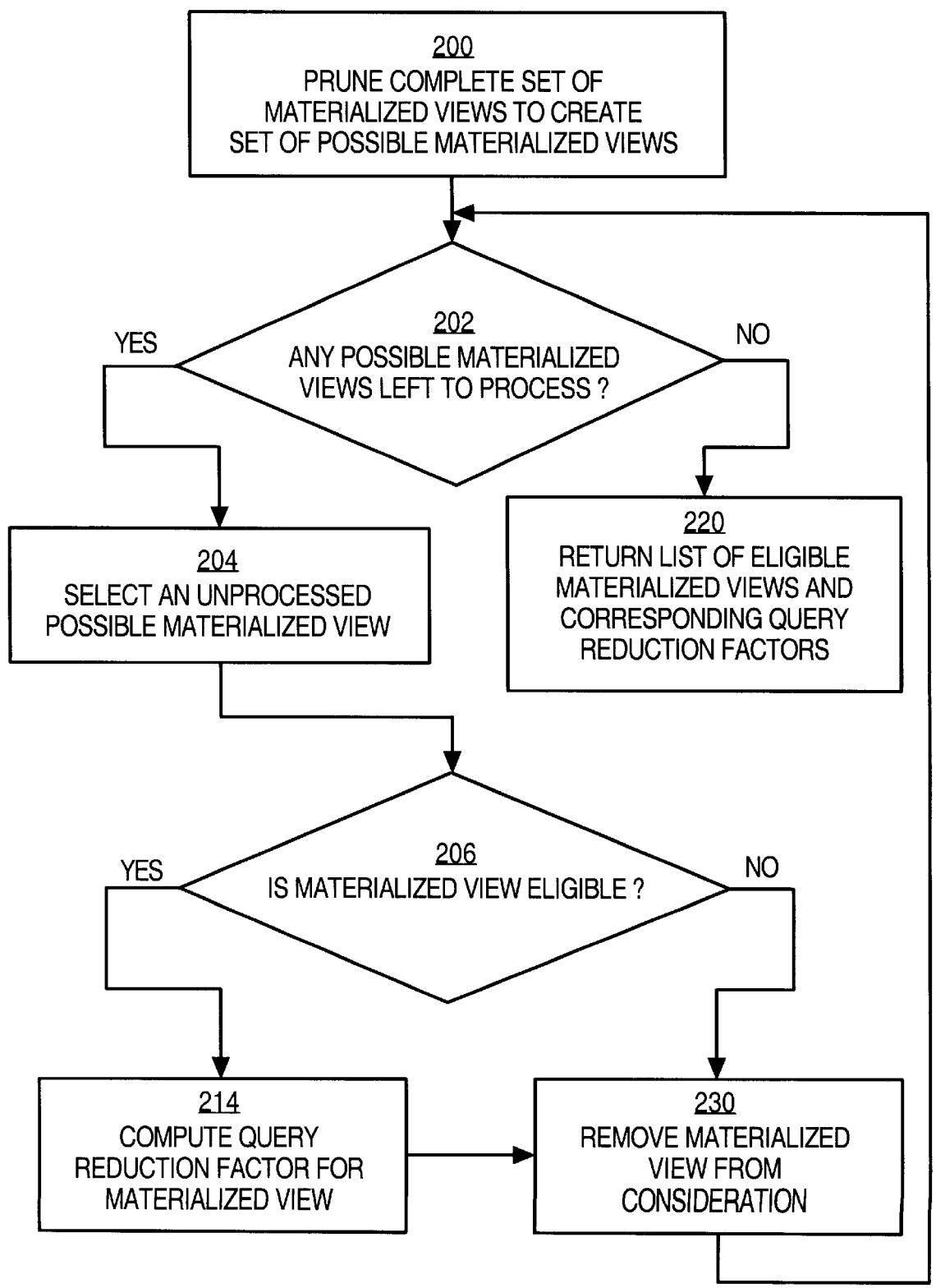
FIG. 2 is a flowchart illustrating steps for generating a list of eligible materialized views that can be used to refresh a given materialized view, according to an embodiment of the invention.

FIG. 2 contains a flowchart that illustrates the steps performed by a database server when the ALL_REWRITE function is called. The set of all of the materialized views included in the database is referred to herein as the "complete set of materialized views". At step 200, the complete set of materialized views is "pruned" to create a set of possible materialized views. The set of possible materialized views includes those materialized views that could possibly be used to process the input query. For example, when the input query is the refresh query of a particular materialized view, that particular materialized view is excluded from the set of possible materialized views because it is not possible to refresh a materialized view from itself.

Various criteria may be used during this pruning process. For example, one possible pruning criteria may be that at least one of the tables referenced in the input query must be a base table of the materialized view. Based on this criteria, a materialized view that has base tables A, B, and C would qualify as a "possible materialized view" with respect to a query that requires a join between tables A and D. On the other hand, a materialized view that has base tables B, C and E would not qualify as a "possible materialized view" with respect to a query that requires a join between tables A and D.

Steps 202 and 204 are used to create a loop in which each materialized view in the set of possible materialized views is processed. During the processing of each materialized view, the database server determines whether the materialized view is actually eligible to be used in a rewrite of the received query, and if so, the relative benefit gained by using that particular materialized view. Specifically, at step 202, it is determined whether any "possible materialized views" are left to be processed. If all possible materialized views have been processed, control passes to step 220. Otherwise, control passes to step 204.

At step 204, an unprocessed possible materialized view is selected. At step 206, it is determined whether the selected materialized view is eligible for use in rewriting the received query. If the selected materialized view is not found to be eligible, control passes to step 230, and the materialized view is removed from consideration. From step 230, control passes back to step 202.

If the selected materialized view is found to be eligible at step 206, control passes to step 214. At step 214, a "query reduction factor" is computed for the materialized view currently being processed. The query reduction factor is a value that estimates how useful it will be to access the materialized view to process the received query. The higher the query reduction factor, the greater the estimated benefit of using the materialized view to process the query.

According to one embodiment of the invention, the query reduction factor for a materialized view is the ratio of (1) the sum of the cardinalities of matching relations in the query that will be replaced by the materialized view to (2) the cardinality of the materialized view.

Under certain circumstances, a particular materialized view may not have all of the information required to process a refresh query when taken alone, but may still be used to process the refresh query when joined with another table (a join back table). The process of joining the materialized view with a join back table is referred to as a join back operation. When use of the materialized view requires a join back, then the query reduction factor is adjusted to take into account the overhead associated with the join back. Specifically, if a join back to a matching table is required, then the query reduction factor is reduced by adding the cardinality of the join back table to the cardinality of the materialized view, thereby reducing the ratio described above.

Control passes from step 214 to step 230. At step 230 the materialized view is removed from consideration. Control then passes back to step 202.

When all of the possible materialized views have been processed, control will pass to step 220. At step 220, the ALL_REWRITE function returns the list of eligible materialized views, along with their respective query reduction factors.

Building a Dependency Graph

Information that indicates the dependencies that exist between the various members of a set of materialized views is referred to herein as a dependency graph. According to one embodiment, the dependency graph for a set of materialized views is created by passing to the ALL_REWRITE function the refresh queries for each materialized view in the set.

For example, assume that:

(1) a database contains four summary tables A, B, C, and D, (2) A_DEF, B_DEF, C_DEF and D_DEF are the summary definitions of summary tables A, B, C and D, respectively, and (3) the summary tables are refreshed using total refresh operations.

Under these conditions, the dependency graph may be built by making four calls to ALL_REWRITE as follows:

ALL_REWRITE(A_DEF)
ALL_REWRITE(B_DEF)
ALL_REWRITE(C_DEF)
ALL_REWRITE(D_DEF)

For the purpose of explanation, it shall be assumed that these calls return the following results:

ALL_REWRITE(A_DEF)=(B, 20), (C, 10)
ALL_REWRITE(B_DEF)=NULL

ALL_REWRITE(C_DEF)=(B, 25)
ALL_REWRITE(D_DEF)=(C, 5)
These results indicate that:
summary tables B and C can be used to refresh summary table A;
no summary tables can be used to refresh summary table B;
summary table B can be used to refresh summary table C; and
summary table C can be used to refresh summary table D.

Figure 3:
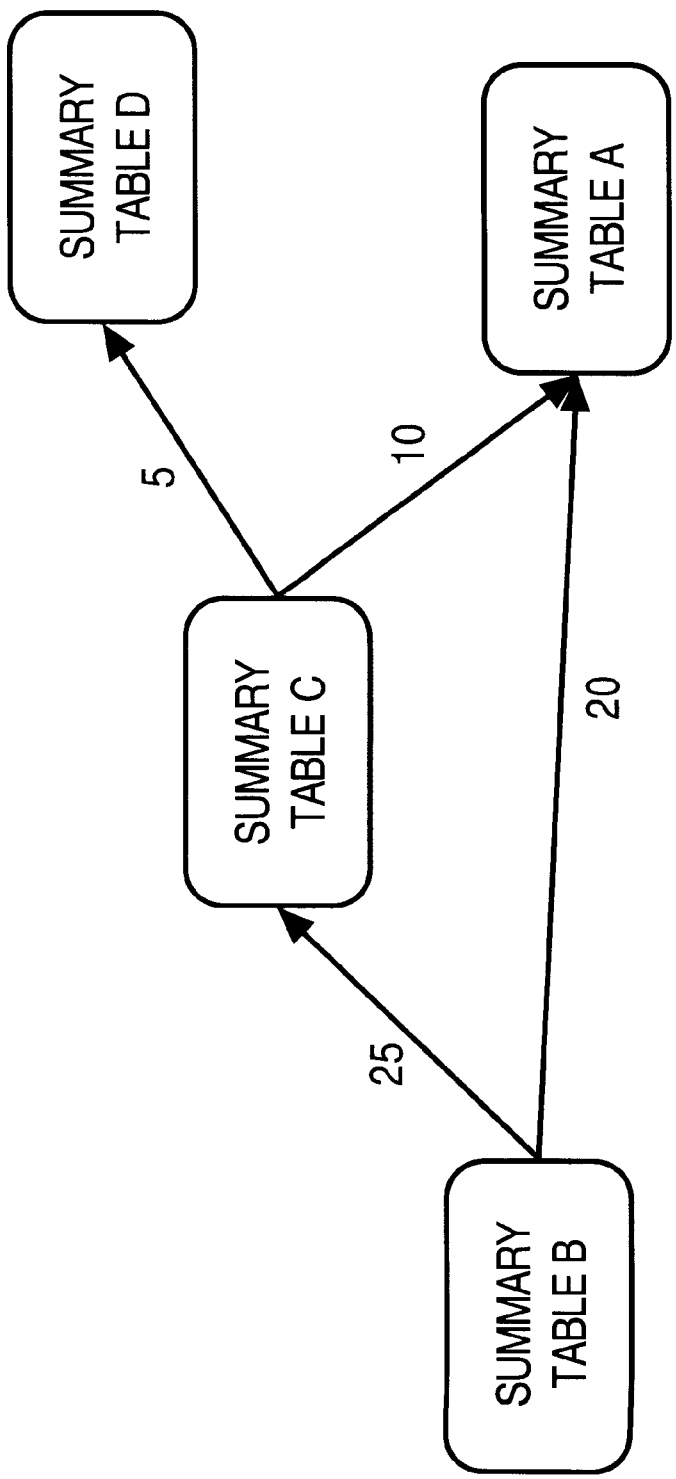
FIG. 3 is a block diagram of a dependency tree according to an embodiment of the invention.

FIG. 3 is a block diagram that gives a visual depiction of this dependency graph.

Determining Refresh Sequence

According to one aspect of the present invention, the refresh mechanism determines the sequence in which a set of materialized views will be refreshed based on the dependency graph generated for the set of materialized views. For example, based on the dependency graph shown in FIG. 3, the refresh mechanism may determine that B is to be refreshed first, then C and A, and then finally D. With respect to the refresh of C and A, these refresh operations may be performed in parallel, or in any sequence relative to each other. With respect to the refresh of D, it may be initiated as soon as the refresh of C is completed, regardless of whether the refresh of A is completed.

To generate a refresh order based on the dependency graph, the refresh mechanism may use any one or combination of possible scheduling strategies. The only restriction on scheduling order is that if a particular materialized view is to be used to refresh another materialized view, then that particular materialized view must itself be refreshed first.

Examples of scheduling policies that may be used by the refresh mechanism include the "greedy" approach, the "optimal predecessor" approach, and the "critical path" approach. Each of these approaches shall be explained with reference to a situation in which a summary table A can be refreshed from any of summary tables B, C and D.

According to the greedy approach, the refresh of A is scheduled to begin as soon as the first of B, C and D completes its refresh operation. Thus, assume all predecessors start at the same time, B takes 6000 seconds to refresh, C takes 5000 seconds and D takes 4500 seconds. In this scenario, the refresh of A will begin when the refresh of D completes, and D will be used to refresh A.

According to the optimal predecessor approach, the refresh of A is scheduled to begin only when the "best" summary from the set B, C, and D completes its refresh operation. In this context, "best" refers to the materialized view with the highest query reduction factor relative to A. For example, if B has a higher query reduction factor than C or D relative to the refresh query of A, then the refresh of A will be scheduled to begin after the refresh of B completes even though C or D may be fresh before B, and B will be used to refresh A.

According to the critical path approach, the refresh mechanism attempts to minimize the total cost of refresh by considering the cost of refreshing the predecessor from its base tables, as well as the cost of refreshing A using that predecessor. For example, assume that the times required to refresh B, C and D from their base tables are 6000, 5000 and 4500, respectively. Assume further that the times required to refresh A from B, from C and from D are 10, 100 and 1000, respectively. Under these conditions, the total time to refresh B, then A from B is 6010; the total time to refresh C, then A from C is 5100; the total time to refresh D, then A from D is 5500. In this case, using predecessor C results in the best total execution time, so the refresh of A is scheduled to begin after C is fresh, and C is used to refresh A.

The scheduling policies described above are merely examples of scheduling policies that may be used by a refresh mechanism to determine a refresh sequence based on dependency information. The present invention is not limited to any particular type or combination of scheduling policies.

Refreshing Materialized Views

Once a refresh sequence has been established using a scheduling policy, the refresh mechanism causes the materialized views to be refreshed according to the refresh sequence. According to one embodiment, the refresh mechanism initially establishes "parent/child" relationships based on the desired refresh sequence. A materialized view P is established as a parent of another materialized view M if the refresh of the materialized view M is scheduled to begin after completion of the refresh of the materialized view P. If a given materialized view is scheduled to begin when any one of a number of other materialized views have completed (as with the greedy approach), then all of those other materialized views are parents of the given materialized view.

After the parent relationships have been established, the refresh mechanism queues the materialized view refresh jobs in one of two states: ACTIVE or SUSPENDED. Initially, only materialized views that do not have any parents are set to the ACTIVE state. The refresh jobs for the remaining materialized views are initially set to SUSPENDED.

The refresh mechanism executes ACTIVE refresh jobs in any order relative to each other, including executing the jobs in parallel with each other. The refresh mechanism does not execute SUSPENDED refresh jobs. When the refresh job for a given materialized view completes, then the refresh job for all materialized views of which the given materialized view is a parent are set to ACTIVE.

It is possible for a plurality of materialized views to share the same parent P, in which case the plurality of materialized views become ACTIVE upon the completion of P. According to one embodiment, jobs are scheduled using a mechanism that allows multiple materialized views to be refreshed concurrently on systems that have multiple processors.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for refreshing a stale materialized view in a database system, the method comprising the steps of:
executing a query that retrieves data from a fresh materialized view in said database system; and
refreshing said stale materialized view based on the data retrieved from said fresh materialized view.

2. The method of claim 1 further comprising the step of creating the query that retrieves data from the fresh materialized view by automatically rewriting a refresh query for said stale materialized view, wherein said refresh query references a plurality of base tables for said stale materialized view but does not reference said fresh materialized view.

3. The method of claim 1 further comprising the step of establishing a refresh sequence that dictates that said fresh materialized view is to be refreshed before said stale materialized view is refreshed.

4. The method of claim 3 further comprising the steps of:
   determining dependencies between a plurality of materialized views in said database system, said plurality of materialized views including said stale materialized view and said fresh materialized view; and
   determining said refresh sequence based on said dependencies between said plurality of materialized views.

5. The method of claim 3 wherein the step of establishing a refresh sequence includes scheduling the stale materialized view to be refreshed after any one of a plurality of other materialized views are refreshed, said plurality of other materialized views including said fresh materialized view.

6. The method of claim 4 wherein:
   the method includes the step of building a dependency graph based on said dependencies between said plurality of materialized views; and
   the step of determining said refresh sequence is performed based on said dependency graph.

7. The method of claim 4 wherein:
   the step of determining said refresh sequence based on said dependencies includes establishing parents for a subset of said plurality of materialized views;
   generating a plurality of refresh jobs to refresh said plurality of materialized views;
   initially setting to an active state the refresh jobs associated with materialized views that do not have predecessors;
   initially setting to a suspended state the refresh jobs associated with materialized views that have parents;
   executing refresh jobs that are in the active state; and
   upon completing execution of a refresh job for a particular materialized view, setting to the active state all refresh jobs associated with materialized views for which the particular materialized view is a parent.

8. The method of claim 7 wherein the step of executing refresh jobs that are in the active state includes executing at least two refresh jobs in parallel.

9. The method of claim 4 wherein the step of establishing a refresh sequence includes establishing said refresh sequence based on a greedy scheduling approach.

10. The method of claim 4 wherein the step of establishing a refresh sequence includes establishing said refresh sequence based on an optimal predecessor scheduling approach.

11. The method of claim 4 wherein the step of establishing a refresh sequence includes establishing said refresh sequence based on a critical path scheduling approach.

12. A computer-readable medium for refreshing a stale materialized view in a database system, the computer-readable medium bearing instructions for performing the steps of:
   executing a query that retrieves data from a fresh materialized view in said database system; and
   refreshing said stale materialized view based on the data retrieved from said fresh materialized view is refreshed.

13. The computer-readable medium of claim 12 further comprising instructions for performing the step of creating the query that retrieves data from the fresh materialized view by automatically rewriting a refresh query for said stale materialized view, wherein said refresh query references a plurality of base tables for said stale materialized view but does not reference said fresh materialized view.

14. The computer-readable medium of claim 12 further comprising instructions for performing the step of establishing a refresh sequence that dictates that said fresh materialized view is to be refreshed before said stale materialized view.

15. The computer-readable medium of claim 14 further comprising instructions for performing the steps of:
   determining dependencies between a plurality of materialized views in said database system, said plurality of materialized views including said stale materialized view and said fresh materialized view; and
   determining said refresh sequence based on said dependencies between said plurality of materialized views.

16. The computer-readable medium of claim 14 wherein the step of establishing a refresh sequence includes scheduling the stale materialized view to be refreshed after any one of a plurality of other materialized views are refreshed, said plurality of other materialized views including said fresh materialized view.

17. The computer-readable medium of claim 15 wherein:
   the computer-readable medium includes instructions for performing the step of building a dependency graph based on said dependencies between said plurality of materialized views; and
   the step of determining said refresh sequence is performed based on said dependency graph.

18. The computer-readable medium of claim 15 wherein:
   the step of determining said refresh sequence based on said dependencies includes establishing parents for a subset of said plurality of materialized views;
   the computer-readable medium further includes instructions for performing the steps of
     generating a plurality of refresh jobs to refresh said plurality of materialized views;
     initially setting to an active state the refresh jobs associated with materialized views that do not have parents;
     initially setting to a suspended state the refresh jobs associated with materialized views that have predecessors;
     executing refresh jobs that are in the active state; and
     upon completing execution of a refresh job for a particular materialized view, setting to the active state all refresh jobs associated with materialized views for which the particular materialized view was a predecessor.

19. The computer-readable medium of claim 18 wherein the step of executing refresh jobs that are in the active state includes executing at least two refresh jobs in parallel.

20. The computer-readable medium of claim 15 wherein the step of establishing a refresh sequence includes establishing said refresh sequence based on a greedy scheduling approach.

21. The computer-readable medium of claim 15 wherein the step of establishing a refresh sequence includes establishing said refresh sequence based on an optimal predecessor scheduling approach.

22. The computer-readable medium of claim 15 wherein the step of establishing a refresh sequence includes establishing said refresh sequence based on a critical path scheduling approach.

* * * * *